United States Patent [19]
Lebel et al.

[11] 3,787,231
[45] Jan. 22, 1974

[54] DENTURES HAVING A DIALKYLPOLYSILOXANE COATING

[75] Inventors: Constantin Lebel, Paris; Pierre Pruvost, Lyon, both of France

[73] Assignee: Rhone-Poulenc S.A., Paris, France

[22] Filed: Oct. 14, 1971

[21] Appl. No.: 189,397

[30] Foreign Application Priority Data
Oct. 15, 1970  France .............................. 70.37259

[52] U.S. Cl. .......... 117/138.8 A, 32/3, 117/161 ZA
[51] Int. Cl. ............................................ A61c 13/24
[58] Field of Search ...................... 32/2–8, DIG. 5; 117/138.8 A, 161 ZA

[56] References Cited
UNITED STATES PATENTS

| | | | |
|---|---|---|---|
| 3,649,345 | 3/1972 | Tolosa ...................................... | 32/2 |
| 3,369,297 | 2/1968 | Halpern et al. ........................... | 32/2 |
| 3,327,392 | 6/1967 | Crow ........................................ | 32/2 |
| 3,423,831 | 1/1969 | Semmelman .............................. | 32/8 |
| 3,681,122 | 8/1972 | Domicone et al. ............. | 117/161 X |
| 3,303,844 | 2/1967 | Johnson et al. ......................... | 32/2 X |
| 3,621,079 | 11/1971 | Leeds ........................... | 117/138.8 X |
| 3,677,810 | 7/1972 | Campbell et al. ................ | 117/161 X |
| 3,272,766 | 9/1966 | Gowman ............................ | 106/35 X |

*Primary Examiner*—William D. Martin
*Assistant Examiner*—Bernard D. Pianalto
*Attorney, Agent, or Firm*—Stevens, Davis, Miller, Mosher

[57] ABSTRACT

Dentures are coated with a film, preferably 0.25 – 5.0$\mu$, of a dialkylpolysiloxane of viscosity 300 – 100,000 centipoise at 25°C. The coating improves the retention of the denture in the mouth and minimizes food adhesion.

5 Claims, No Drawings

DENTURES HAVING A DIALKYLPOLYSILOXANE COATING

The present invention relates to the treatment and care of dentures.

Various problems arise for the wearers of dentures such as grip in the mouth, slipping, adhering food remnants, the need for frequent washing and brushing, and discomfort.

We have now found that silicone oils can be advantageously utilised in the treatment and care of dentures.

Accordingly, the present invention provides a denture coated with a film of silicone oil and a process for improving the characteristics of a denture by coating it with a film of a silicone oil.

The use of silicone oils in numerous applications has been known for a long time, especially in the treatment of various supports, where their value resides in their non-stick and water-repellent properties.

We have found that the effect of increased slip, which could have been expected, because of the lubricating capacity of silicone oils, was, in fact, less marked than with an untreated denture, and was even nil in some cases. This unexpected phenomenon can be explained by the fact that the water-repellent character of the silicone oil allows the water, the saliva and the air to escape between the treated support and the palate, thus producing a particularly large suction effect. Furthermore, the thin film of silicone compensates for the effect of any micro-imperfections on the support part of the denture which faces the finely striated surface of the palate. Accordingly, perfect matching of the denture to the jaw results.

A further advantage resulting from the use of the silicone oil is that foodstuffs and their remnants have a very considerably reduced tendency to stick to the denture. This effect is seen during mastication and is very appreciable, principally in the case of particularly thick and sticky foodstuffs such as caramel. The need for prolonged brushing or steeping of the denture in cleansers virtually disappears and food remnants are easily removed by simply holding the coated denture under water.

A further advantage of the coated denture of the invention is comfort. Silicone, which is known to be accepted by live tissue without a rejection or irritation acts like a thin layer of live matter.

The silicone oils which can be employed in the invention are generally dialkylpolysiloxane oils such as dimethylpolysiloxane oils, of viscosity, at 25°C, of 300 to 100,000 centipoises and preferably 5,000 to 15,000 centipoises. Their total lack of toxicity and their perfect neutrality avoid any inflamation or irritation of the mucous membranes or of the gums.

In order to carry out the invention successfully the silicone coating should be extremely thin; the thickness of the film of silicone oils should preferably be 0.25 to 5 microns and particularly 0.5 to 2 microns.

The silicone oils can be applied to the dentures by any known means such as a brush or paint-brush, or preferably by spraying from an aerosol formulation. This latter technique makes it possible easily to deposit a very fine and perfectly distributed layer over the entire surface of the denture.

The film of silicone oils lasts sufficiently well to remain for a period of more than 1 day. In practice, the silicone oil can be applied initially every 24 hours and subsequently less frequently, as required.

The denture which may be coated in accordance with the present invention, will normally comprise a support plate carrying one or more teeth, generally but not necessarily, artificial teeth. For best results, all the surfaces of the denture should be coated with the silicone oil.

We claim:

1. A denture having increased adherence to the mouth comprising a support plate, a surface of said support plate, which contacts the mouth, having a coating of a film consisting essentially of a dialkylpolysiloxane oil of viscosity of 300 to 100,000 centipoises at 25°C.

2. A denture according to claim 1, wherein the silicone oil is a dialkylpolysiloxane oil of viscosity of 5,000 to 15,000 centipoises at 25°C.

3. A denture according to claim 1 wherein the dialkylpolysiloxane is a dimethylpolysiloxane.

4. A denture according to claim 1 wherein the thickness of the film of silicone oil is 0.25 to 5 microns.

5. A denture according to claim 4 wherein the thickness of the film of silicone oil is 0.5 to 2 microns.

* * * * *